FITZHUGH & YOUNG.
Harvester Rake.
No. 25,327. Patented Sept. 6, 1859.
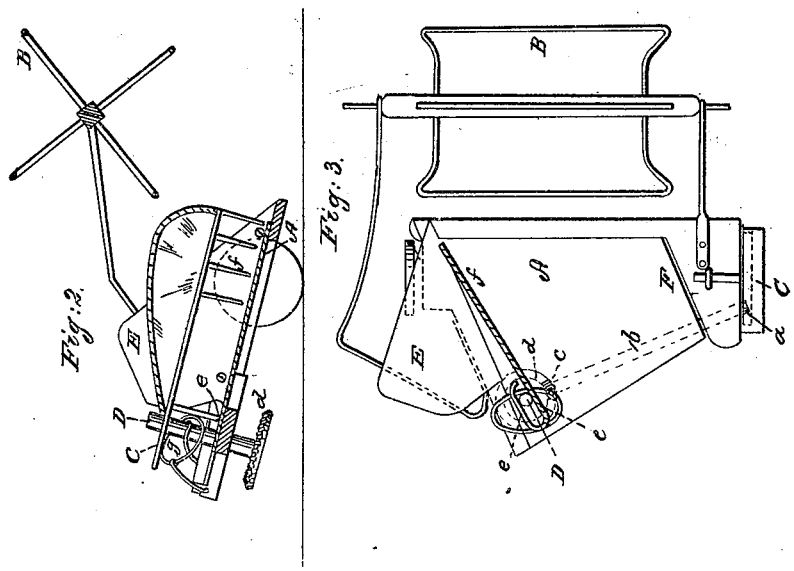
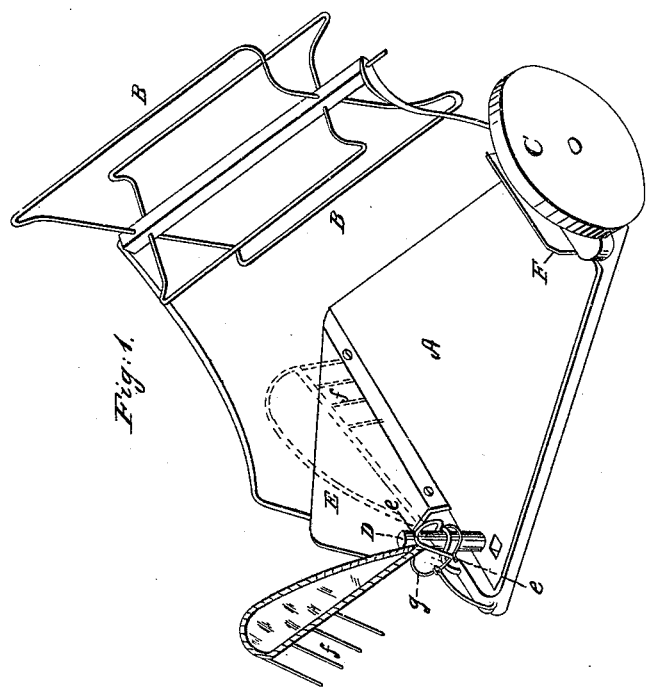

UNITED STATES PATENT OFFICE.

B. G. FITZHUGH AND McC. YOUNG, JR., OF FREDERICK, MARYLAND.

IMPROVEMENT IN AUTOMATIC RAKES FOR REAPING-MACHINES.

Specification forming part of Letters Patent No. 25,327, dated September 6, 1859.

*To all whom it may concern:*

Be it known that we, BENJAMIN G. FITZHUGH and McCLINTOCK YOUNG, Jr., of Frederick, in the county of Frederick and State of Maryland, have invented certain new and useful Improvements in Automatic Rakes as Applied to Harvesting-Machines; and we do hereby declare the following to be a full, clear, and exact description of the construction and arrangement of the same, reference being had to the accompanying drawings, making a part of this specification, in which—

Figure 1 represents in perspective so much of a harvesting-machine as will illustrate the nature and operation of our invention. Fig. 2 represents a transverse section through the platform and reel, leaving the rake in elevation; and Fig. 3 represents a top plan of the platform, reel, and rake.

Similar letters of reference, where they occur in the separate figures, denote like parts of the machine in all of them.

We are aware that many varieties of automatic rakers have been applied to harvesting-machines, and among them may be found sweep-rakes that have a rising-and-falling motion in connection with their revolving motion, substantially like the one we here represent. We desire therefore to be understood as laying no claim to the rake itself in this application, our invention consisting in the position of the rake, and, as incidental to that position, its operation.

In almost all cases heretofore the self-acting rake has been hung on the gearing side of the machine, its shank or stem being in close proximity to the main driving-gear, from whence it receives its motion. In some cases, however—as, for instance, in the patent of B. G. Fitzhugh, (one of the present applicants,) of the 28th March, 1854—the rake-post has been arranged centrally in the line of the length of the platform, and previous to that period it was still more centrally placed on the platform. Now, all these positions present the rake badly to the falling grain, and more or less of the falling grain will hang on the rake and tangle, and thus deliver bad gavels, some of the rakes dribbling the gavel along its path.

Our invention consists in locating the rake-post or stem around which the rake turns on the rear left-hand corner of the platform, so that when the rake meets the platform or approaches it, preparatory to its clearing the platform of the cut grain, it shall stand in the line of the advancing motion of the machine, and the grain shall fall on one side or the other of it, and not on it, as it would in any other position. This is one important matter incident on this location. Another is that the delivery-point is precisely the same as that used in hand-raking, and should the self-acting rake get disarranged or out of working order a raker's stand may be affixed in its usual position on that corner of the platform and the raking be done by hand, the self-acting rake in no wise interfering with the hand delivery.

To enable others skilled in the art to make and use our invention, we will proceed to describe the same with reference to the drawings.

A represents a platform of the form known as the "Manny" platform. B is a reel supported thereon and rotated in any of the usual well-known ways. C is the main drive-wheel. It may have an internal gear, which drives a pinion, $a$, on the shaft $b$, (in dotted lines in Fig. 3,) which shaft passes underneath the platform A and extends toward the rear left-hand corner of said platform, calling the "left" side of the machine that which runs next the standing grain, and has upon its farther end a bevel-pinion, $c$, that gears with and turns a bevel-gear, $d$, on the lower end of the rake-post D, and thus turning said rake-post. To this post D is pivoted the shank $e$ of the rake $f$, and around the post D is arranged a cam, $g$, against which the bent end $e'$ of the rake-shank works to raise and lower the rake at proper intervals. The end $e'$ of the shank should have a friction-roll on it that would run under the cam or its ledge, or rolls above and below the cam to keep the rake steady in its motions. The rake should be curtained, too, to prevent the falling grain from dropping and hanging on the rake-head. The rake sweeps around over the platform, clearing it of all the grain. It then rises, as seen in Fig. 1, and continues up until it is over the outside fence or guiding-board E, when it descends with a shear motion, that keeps it close to said fence and to that end of the platform. There is a curved guard-board, F, at the main-frame end of the platform, which in case of choking at that point, as might sometimes happen, will allow the grain to rise up and over, and thus not damage the rake, though the rake scarcely ever fails to sweep off the gavels in a compact, regular, and good shape for binding. This position of the rake-post removes it, as well as the rake-shank, from the main frame or gearing, and thus leaves that part of the machine free and unincumbered. It is entirely out of the way of the free delivery of the cut material onto the platform by the action of the reel, and it leaves the platform entirely free of any incumbrance, as the gearing that operates the rake can be underneath the platform or underneath a shield on the platform. In a word, its position has all the advantages that that position has for a raker's stand.

Having thus fully described the nature and object of our invention, what we claim therein as new, and desire to secure by Letters Patent, is—

The locating of an automatic sweep-rake at the rear left-hand or outside corner of the platform when said rake has a rising-and-falling motion that will admit of its passing over the outside division board or fence, and then drop into or onto the extreme outer end of the platform and sweep it of the cut grain, substantially as described.

B. G. FITZHUGH.
McCLINTICK YOUNG, JR.

Witnesses:
A. B. STOUGHTON,
THOS. H. UPPERMAN.